United States Patent [19]

Thijs, deceased et al.

[11] 4,235,959

[45] Nov. 25, 1980

[54] PHOTOGRAPHIC MATT LAYERS OR SURFACES

[76] Inventors: Victor J. M. Thijs, deceased, late of Berchem, Belgium; Paul E. Huyghebaert, administrator, Hikstraat 40, B 2410 Herentals, Belgium; Nikolaas C. De Jaeger, Armand Segherslei 96, B 2510 Mortsel, Belgium; Bernard H. Tavernier, Prins Boudewijnlaan 357, B 2520 Edegem, Belgium

[21] Appl. No.: 8,855

[22] Filed: Feb. 2, 1979

[30] Foreign Application Priority Data

Feb. 3, 1978 [GB] United Kingdom ............... 4479/78

[51] Int. Cl.³ .......................... G03C 5/26; G03C 1/78
[52] U.S. Cl. .................................. 430/531; 430/539; 430/950; 430/961
[58] Field of Search ............. 96/87 A, 87 R; 430/950, 430/961, 539, 531

[56] References Cited

U.S. PATENT DOCUMENTS

| | | | |
|---|---|---|---|
| 1,929,290 | 10/1933 | Schmidt | 96/87 R |
| 2,819,165 | 1/1958 | Mackey | 96/87 R |
| 3,253,926 | 5/1966 | Van Pee | 96/114 |
| 3,539,378 | 11/1970 | Shephard et al. | 96/87 R |
| 3,627,563 | 12/1971 | Bollen et al. | 96/87 R |
| 3,915,709 | 10/1975 | Welch | 96/87 A |
| 3,920,456 | 11/1975 | Nittel | 96/67 |

*Primary Examiner*—Mary F. Downey
*Attorney, Agent, or Firm*—A. W. Breiner

[57] ABSTRACT

Hydrophilic coating compositions are made comprising a protective colloid and dispersed therein a matting agent. The matting agent is obtained by mixing in aqueous medium area, formaldehyde and an aqueous colloidal dispersion of silica. The mixture is buffered to keep the pH at 3.2 or lower. Urea and formaldehyde are polycondensed while vigorously stirring until particles comprising urea-formaldehyde resin and silica are formed of average particle size of 1-8 μm. The rate of stirring is reduced and the pH is raised to 5 or higher to prevent afterpolycondensation and agglomeration of the polymer particles. A hydrophilic colloid is then dissolved in the reaction mixture.

Photographic light-sensitive silver halide material incorporating a layer formed from the hydrophilic coating composition.

8 Claims, No Drawings

PHOTOGRAPHIC MATT LAYERS OR SURFACES

This invention relates to photographic matt layers or surfaces and to a process for preparing same.

It is generally known in the photographic art to use light-sensitive silver halide material containing finely divided grains in a layer coated at the light-sensitive emulsion side and/or at the rear side of the support. According to the degree of partition, the size and the nature of the said grains, a matting is obtained. When the layer is an outer layer, the obtained surface roughness facilitates retouching and reduces the risk of undesirable diffusion phenomena during the contact of the photographic material with another material, e.g., when the photographic material is packed or wound on a spool. This roughness also prevents the generation of static electricity, which causes sparks and thus exposure of the photographic material, as well as the formation of Newton rings when printing and enlarging, while the contact surface of said light-sensitive element with a superjacent or underlying material is reduced.

The grains proposed hitherto for being used as matting agents in photographic material, such as grains of starch, inorganic pigments, plastics, finely divided cellulose, waxes, hardened gelatin and urea-formaldehyde resin, show one or more of the following drawbacks: a partial dissolution when heating the photographic material, e.g., in a drying machine, which causes the formation of glittering spots; a relatively high density, which causes the matting agent not to remain in suspension in the coating composition; a refractive index which differs too much from that of gelatin, which causes the silver image to look less black; and an insufficient inertness to the light-sensitive silver halide emulsion. Further, the particles appear as relatively large grains or as a mixture of grains with widely varying size.

Coating compositions containing matting agents are subject to coagulation and to agglomeration of the matting particles. These phenomena are especially disturbing when coating occurs continuously over long periods of time. The coagulations and agglomerations may bring about clogging e.g. of the supply lines for the coating composition. Matting particles may also precipitate on the outlet of the coating devices so that stripes are formed in the applied layers. At the same time and as a result of sedimentation of part of the matting agents in the coating device and the supply pipes, an exact determination of the amount of matting applied is rendered impossible.

Consequently the instability of coating compositions containing matting agents may cause a lot of losses and delay during coating operations.

It is an object of the invention to manufacture hydrophilic colloid compositions containing matting agents, which compositions are completely stable and do not possess the above described disadvantages of coagulation, agglomeration and precipitation.

According to the invention a method is provided for preparing a hydrophilic colloid composition comprising a protective colloid such as gelatin, and dispersed therein a matting agent, which method comprises mixing urea, formaldehyde, and an aqueous colloidal dispersion of silica particles, said mixture being buffered to keep the pH of the mixture at 3.2 or lower, polycondensing the urea and formaldehyde whilst vigorously stirring the mixture until particles comprising urea-formaldehyde resin and silica are formed having a average particle size between 1 and 8 μm, reducing the rate of stirring and raising the pH of the mixture to 5 or higher to prevent after polycondensation and agglomeration of said polymer particles, and dissolving a hydrophilic colloid such as gelatin in the reaction mixture.

The stable matting dispersion thus formed can be used as such, if necessary after dilution with water, to form a hydrophilic colloid coating composition or it can be admixed with another hydrophilic colloid coating composition. By-products can be removed by washing of the gelled and noodled colloid composition or by any other precipitation and washing technique commonly employed in the preparation of silver halide emulsions.

The invention includes any material suitable for use in photographic recording processes having a matt layer formed from a composition prepared by a method as above defined. The invention in particular includes a photographic light-sensitive material, comprising a support and at least one light-sensitive silver halide emulsion layer and at the side of said emulsion layer and/or at the other side of the support, a layer comprising a protective colloid such as gelatin having dispersed therein particles of an average particle size between 1 and 8 μm, such layer having been formed from a hydrophilic colloid coating composition as described above.

Suitable aqueous colloidal dispersions of silica particles are commercially available under the denominations "LUDOX", trade-mark of E. I. du Pont de Nemours, Wilmington, Del. USA, and "SYTON" trade-mark of Monsanto Chemical Corporation, Boston, Mass., USA. Equally suitable are the "BAYER-KIESELSOLE" marketed by Farbenfabriken Bayer, Leverkusen, West-Germany. Among these colloidal dispersions those formed of silica particles with an average grain diameter between 10 and 100 nm e.g. about 25 nm are preferred.

Normally these commercially available aqueous colloidal dispersions are of basic character and preferably before their addition to the reaction mixture they are brought to a pH of about 3 by the addition of a suitable amount of a strong acid, such as sulphuric acid. However, there are also commercially available colloidal dispersions of acid character having already a pH of about 3. When mixing these acidic dispersions with the urea and formaldehyde, the previous addition of a strong acid is, of course, no longer needed.

The temperature of the polycondensation reaction is kept relatively low, preferably below about 50° C., and more preferably at about 30°-40° C. in order to more easily control the growth of the polymer particles; at these low temperatures the polycondensation is easily controllable by the pH value of the medium.

According to the method of the invention the polycondensation of urea and formaldehyde in the presence of colloidal silica is carried out whilst vigorously stirring at pH 3.2 or lower. Indeed, the polycondensation rate is pH-dependent, the lower the pH, the faster polycondensation will proceed. The pH-range of 3.2 and lower is reached by the addition to the reaction mixture of suitable buffering agents, e.g., a mixture of citric acid and disodium hydrogen phosphate. By raising the pH to 5 or higher, afterpolycondensation can be avoided.

Not only the polycondensation rate is pH-dependent but also the size of the matting particles is governed by the pH, as agglomeration and even precipitation is strongly related to the actual pH of the medium. The higher the pH, the lower the agglomeration rate so that above pH 5 practically no agglomeration occurs and a stable dispersion of particles is obtained. Contrary thereto at pH 2 a complete and irreversible precipitation of the matting particles formed would take place already after a few minutes. Precipitation at the polycondensation pH is avoided by vigorous stirring using a suitable high speed stirring apparatus. The term "stirring" denotes any action which generates shear stresses.

Accordingly, the polycondensation reaction—during which at the same time colloidal silica particles are built in—must be started while applying strong shear stresses on the matting particles to keep them suitably small and to prevent agglomeration thereof. As already said, this can be done by using a high speed stirring apparatus. In this way can be used e.g. the Kothoff Mischsirene, a dispersion system of Hans Kothoff, Apparate- und Maschinenbau, Rodenkirchen, West-Germany, or the Rapisonic devices of Ultrasonics Ltd., Westgate Otley, Yorkshire, England.

After a short period of time, normally after about 15 minutes at a reaction temperature of about 40° C., particles of an average diameter comprised between 1 and 8 μm are formed. Further particle growth can now be neglected and the stirring rate can be lowered. The stirring rate is now controlled on the one hand so that the reaction mixture does not gel as a result of colloidal structuration and on the other hand so that agglomeration of the matting particles which at that time remain relatively plastic is prevented.

Further polycondensation of urea and formaldehyde can be practically stopped now by bringing the pH of the reaction mixture to at least 5.

Thereupon an amount of hydrophilic colloid such as gelatin is dissolved in the aqueous dispersion, possibly together with an amount of phenol as a preservative. When the thus formed dispersion is cooled, gelation of gelatin occurs so that a gel is formed wherein the matting particles are stably dispersed. Such a gel can be stored in a refrigerator for long periods of time. For further use such a gel needs simply be melted to form—if necessary after dilution with water or mixture with a hydrophilic colloid composition—a stable coating composition containing matting particles.

Formaldehyde is used in the polycondensation mixture generally in an amount comprised between 50 and 75 mole % of the amount of urea present, so that the polycondensation rate is kept relatively low and agglomeration and precipitation of the particles can be easily prevented by the vigorous stirring.

The amount of colloidal particles of silica added may vary within very large limits: more especially the dry weight of silica may vary between 2 and 50% by weight of the combined weight of urea and formaldehyde present.

Normally the particles obtained are completely shapeless. However, when the polycondensation takes place in the presence of a salt of ammonium, such as ammonium sulphate or ammonium chloride, spherical particles can be formed.

It has further been noted that the addition to the polycondensation reaction of an anionic surfactant, results in the formation of a matting dispersion of increased colloid physical stability and possessing more homogeneous and smaller particles. An anionic surfactant can be built-in in the particles, e.g. when the reaction of urea and formaldehyde occurs in the presence of a naphthalene-sulphonic acid-formaldehyde polycondensate.

It was interesting to note that the initially water-soluble naphthalene-sulphonic acid-formaldehyde polycondensate could no longer be eliminated by extraction from the finally obtained urea-formaldehyde resin particles, thereby proving that the anionic surfactant was built-in in the matting particles. This was not the case when the naphthalene-sulfonic acid-formaldehyde polycondensate was replaced by a simple α-naphthalene sulphonate. Although the favourable influence on agglomeration of the particles was the same, this latter product could be eliminated at least partially by extraction with water from the urea-formaldehyde resin particles.

It was generally expected that the process of the invention would procure particles wherein nuclei of silica are surrounded by urea-formaldehyde resin. This was not the case. It was noted that at the start of the polycondensation of urea and formaldehyde, polymeric product was adsorbed on the surface of the silica particles. Several thus coated silica particles stick together by means of the growing polymer so that finally particles of an average diameter comprised between 1 and 8 μm were formed. Further growth is prevented as a result of the great shear stresses applied during the vigorous stirring.

This was confirmed by calcinating the matting particles formed. The calcination eliminated the urea-formaldehyde resin and skeletons of pure silica of practically unchanged diameter remained.

Descriptions of preparation processes are now given wherein the preparation of particle dispersions according to the invention are exemplified. The average diameter of the matting particles referred to hereinbefore and in the following preparations and examples has been determined on a weight basis.

PREPARATION 1

The following three solutions were formed:

| A. | demineralised water | 2460 ml |
| | disodiumhydrogen phosphate | 6.3 g |
| | citric acid | 20.4 g |
| | urea | 432 g |
| | ammonium sulphate | 72 g |
| B. | aqueous colloidal solution of silica | 888 ml |
| | demineralised water | 939 ml |
| | 6N sulphuric acid to bring at pH 3 | 21.1 ml |
| C. | 20% aqueous solution of formaldehyde | 576 ml |

The aqueous colloidal solution of silica had a concentration of 30% of silica and a pH of ca. 9 and the particles had a mean diameter of 25 nm.

Solution B was added to A in a vessel kept at 40° C. Stirring occurred with a high speed stirrer at about 6000 revolutions per minute (rm). Thereafter C was added. The mixture had now pH 3. Stirring was continued for 15 minutes whereafter the solution became cloudy due to a begin of polymerisation. Measurements showed that the average diameter of the articles was now about 2 μm.

The speed of the stirrer was decreased to 3000 rm whereafter stirring was continued for 2 hours at 40° C. followed by another 2 hours at 60° C., to harden the polymer particles.

The pH was now brought at 6 with 110 ml 2 N sodium hydroxide, and 300 g of gelatin were added that dissolved in the mixture after 1 hour stirring at 300 rm.

45 ml of a 20% aqueous solution of phenol were added as preservative and the dispersion was cooled whereby gelatin gelled out. In the thus formed gel the matting particles were stably dispersed and this gel could be stored in a refrigerator until needed for use. The gel comprised 5.5% by weight of gelatin and 9.2% by weight of spherical matting particles having a mean diameter of 3.2 μm.

PREPARATION 2

The process of preparation 1 was repeated with the difference that in solution A the ammonium sulphate was omitted and that solution B was composed as follows:

| | |
|---|---|
| aqueous colloidal solution of silica (concentration 30% silica, mean diameter of particles 25 nm, pH ca. 9) | 222 ml |
| demineralised water | 1605 ml |
| 6N sulphuric acid to bring pH of dispersion at 3 | 5.2 ml |

After the polycondensation reaction the pH was increased to 6 with 110 ml 2 N sodium hydroxide and 300 g of gelatin were dissolved in the dispersion together with 45 ml of a 20% aqueous solution of phenol.

The dispersion was cooled whereby a gel was formed having the matting particles dispersed therein. The gel contained about 5.5% by weight of gelatin and 8.4% by weight of shapeless matting particles of a mean diameter of 3.3 μm.

PREPARATION 3

The process of preparation 1 was repeated with the difference that in solution A ammonium sulphate was omitted and that solution B was composed as follows:

| | |
|---|---|
| colloidal solution of silica (concentration 30% silica, average particle diameter 25 nm, pH ca. 9) | 89 ml |
| demineralised water | 1738 ml |
| 6N sulphuric acid to bring at pH 3 | 2.15 ml |

Only 106 ml of 2 N sodium hydroxide were needed after the polycondensation to bring the pH at 6. Thereafter 300 g of gelatin and 45 ml of a 20% aqueous solution of phenol were dissolved in the dispersion whilst slowly stirring for 1 hour. Next the dispersion was cooled to form a gel containing about 5.5% by weight of gelatin and 5.0% by weight of shapeless matting particles of an average diameter of 3.0 μm.

PREPARATION 4

The process of preparation 1 was repeated with the sole difference that solution B was composed as follows:

| | |
|---|---|
| colloidal solution of silica (concentration 30% of silica, average diameter of particles 25 nm, pH ca. 9) | 44.5 ml |
| demineralised water | 1782.5 ml |
| 5N sulphuric acid to bring at pH 3 | 1.35 ml |

After the polycondensation reaction 123 ml of 2 N sodium hydroxide were added to bring the pH at 6. Thereafter 300 g of gelatin and 45 ml of a 20% aqueous solution of phenol were dissolved in the dispersion whilst slowly stirring for 1 hour. The dispersion was now cooled whereby it formed a gel containing about 5.5% by weight of gelatin and 4.8% by weight of spherical matting particles having an average particle diameter of 4.6 μm.

PREPARATION 5

The following three solutions were formed:

| | | |
|---|---|---|
| A. | demineralised water | 2460 ml |
| | disodium hydrogen phosphate | 6.3 g |
| | citric acid | 20.4 g |
| | urea | 432 g |
| B. | colloidal solution of silica | 89 ml |
| | demineralised water | 1738 ml |
| | citric acid to bring at pH 3 | 35 ml |
| C. | 20% aqueous solution of formaldehyde | 576 ml |

The aqueous colloidal solution of silica was of acidic character, had a concentration of 30% of solids, a pH of ca. 3.4 and the particles had a mean diameter of 25 nm.

Solution B was added to A in a vessel kept at 40° C. Stirring occurred with a high speed stirrer at about 6000 rm. Thereafter C was added while keeping the temperature at 40° C.

After 15 minutes stirring at 40° C. the speed of the stirrer was decreased to 3000 rm and after 2 hours the temperature was increased at 60° C. while stirring at the same speed of 3000 rm.

The pH was then brought at 6 with 104 ml 2N sodium hydroxide and 300 g of gelatin were added and dissolved in the mixture while slowly stirring at about 300 rm for 1 hour, whereafter 45 ml of a 20% aqueous solution of phenol were added.

The dispersion was now cooled, whereby gelatin gelled out. This gel comprised the matting particles stably dispersed therein, and could be stored for long times in a refrigerator. The gel was composed of 5.5% by weight of gelatin and 5.0% by weight of shapeless matting particles of a diameter of 3.9 μm.

The dispersions of matting particles according to the invention can be added to the coating compositions for the application of protective layers at the emulsion side as well as the rear side of photographic materials. These protective layers prevent generation of static electricity and prevent formation of Newton rings during printing and enlarging. The matting dispersions are admixed with the coating composition using surface active agents as dispersing agents e.g. alkylphenyl ethers of polyethylene glycol and carboxy alkylated or sulphoalkylated derivatives thereof of the type described in U.S. Pat. Nos. 2,600,831 of Walter Dewey Baldesiefen issued June 17, 1952, 3,026,202 of William J. Knox Jr. and John F. Wright issued Mar. 20, 1962, and 3,663,229 of Frans Jan Ville, Josef Frans Willems and Hendrik Adolf Pattijn issued May 16, 1972, long chain sulphates, sulphonates and carboxylates, fluorinated surfactants e.g. of the type described in Belgian Pat. Nos. 742,680 filed Dec. 5, 1969 by Gevaert-Agfa N.V., and 766,835 filed May 7, 1971 by Agfa-Gevaert N.V. and the published German Patent Application Nos. 1,942,665 filed Aug. 21, 1969 by Ciba S.A. and 1,950,121 filed Oct. 4, 1969 by Du Pont de Nemours, etc.

When the matting dispersions of the invention are added to coating compositions destined to form antistress layers on the emulsion side of the material, the amount of matting agent generally varies between 2 and 3 g per 30 g of gelatin present in the coating composition. Normally these antistress layers, comprise besides gelatin and matting agents, wetting agents e.g. fluorinated surfactants as referred to above e.g. perfluorocaprylic acid ammonium salt and/or the perfluorocaprylamide of polyglycol and also hardening agents such as formaldehyde or dimethylolurea. Of course the amount of hardener depends on the amount of gelatin in the underlying layer. The underlying layer is normally a silver halide emulsion layer. It may comprise surfactants e.g. carboxyalkylated alkylphenyl polyglycol ethers as referred to above.

The dispersions of matting agent may also be added to the coating compositions for backing layers. When only one backing layer is applied the matting agent is added to this single layer in an amount generally varying between 3 and 15 g per 100 g of gelatin.

The backing layer may also be applied in two steps. In that case the first layer is the actual antihalation, antistatic or non-curling layer, whereas the second layer may be considered as a kind of antistress layer containing the matting dispersion. In such a procedure the amount of matting dispersion added is much higher, e.g. from 20 to 40 g of matting particles for 40 to 60 g of gelatin. The reason therefore is that in this case the coverage rate for such a second backing layer is much lower than the coverage rate for a single layer e.g. 1000 g/80–100 sq.m, compared with 1000 g/16–20 sq.m for the single layer.

A very interesting application of the matting dispersions of the invention, especially of matting dispersions of particles possessing an average diameter of 2 to 4 μm is their use in layers for permitting the application at much accelerated coating speeds of other photographic layers at the opposite side of the support than that carrying the matt layer.

It has been noticed that during transport of smooth films over highly polished conveyor rollers of a coating deivce, a problem arises of achieving permanent contact between the film and the rollers, especially when the angle of lap of the film over the rollers is small. As the running speed of the film increases, the pressure of the air enclosed between the film and the rollers may rise to such an extent that from a critical speed on, the film is lifted from the rollers. Thereby the rotational speed of the conveyor rollers starts diminishing as compared to the speed of the film so that scratches may form on the surface of the film. At the same time the film is no longer guided by the rollers but starts moving uncontrollably in lateral direction on the rollers.

It has been proposed to roughen the surface of the rollers by providing them with helicoidally applied grooves or to wind a thread material in helicoidal way around the rollers, allowing the air pressure to be carried away. However, such roughness easily damages the surface of the film. It has been found that it is much better to give the film itself a certain roughness. Therefore the film at its side in contact with the highly polished conveyor rollers of the coating device, i.e. at the side opposite to that which is to be coated, is provided with a subbing layer containing matting grains such as formed herein of an average diameter of 2 to 4 μm and in an amount comprised between 0.1 and 10 mg/sq.m, preferably between 0.5 and 2 mg/sq.m.

Subbing layers in general have a thickness beneath 1 μm, so that the matting grains of an average diameter of 2 to 4 μm, necessarily protrude from the surface of the subbing layer and provide the desired surface roughness. In this way the flowing off of the air enclosed between film and conveyor rollers is facilitated so that the coating speed to the other side of the film of all kinds of photographic layers may be greatly increased, without impairing the physical and photographic properties of these layers. Surprisingly, such matting agents when applied in the prescribed amounts do not give a matt appearance to the finished photographic material.

In the above described application of the matting dispersions according to the invention, the matting dispersion is added to the coating composition of a subbing layer. When a film of polyester such as a film of polyethylene terephthalate is used as the film support, this subbing layer may be the second layer of a subbing layer combination, the first layer of which is a primer layer coated before, during or after the biaxial stretching of the polyester film support. Thereby the second layer is the so-called subbing layer. Such a subbing layer combination has been described in the U.K. Patent Specification No. 1,234,755 filed Sept. 28, 1967 by Gevaert-Agfa N.V.

The matting dispersion may also be incorporated in the primer layer itself of the above described subbing layer combination, prior to or during the stretching operation or also in a separate treatment afterwards.

The matting dispersion may also be added to the coating composition of a single subbing layer, such as described in the U.K. Patent Specification No. 1,421,758 filed May 26, 1972 by Agfa-Gevaert N.V. and in the U.K. Patent Application No. 11,216/76 filed Mar. 19, 1976 by Agfa-Gevaert N.V.

In the case of other film supports, such as films of cellulose triacetate, films of polystyrene or films of polyvinyl chloride, the matting dispersion according to the invention may be added to any subbing layer coating composition, known for these different film supports.

The above process of adding dispersions of an average diameter of 2 to 4 μm in the prescribed amounts to subbing layer coating compositions, allows the accelerated coating, at the other side of the support, of different types of photographic layers, e.g. gelatin layers, hydrophilic colloid layers containing light-sensitive silver halide, hydrophilic polymer or colloid layers containing any kind of dyestuffs, antistatic agents, electroconductive pigments, photoconductive insulating pigments, photosensitive semiconductive pigments, and true matting agents.

The invention is illustrated by the following examples.

EXAMPLE 1

A photographic element comprising a film support having a hydrophilic antihalation back coating on one side, and on the reverse side a light-sensitive layer containing silver halide was provided with a protective coating over the light-sensitive layer. Therefore the following coating composition at 36°–38° C. was applied at 1000 g/32 sq.m:

| | |
|---|---|
| gelatin | 27 g |
| matting dispersion | 5 g |
| 12% aqueous solution of saponine | 30 ml |
| 5% aqueous solution of the sodium salt of tetradecylsulphate | 15 ml |
| 4% aqueous solution of formaldehyde | 30 ml |
| demineralized water up to | 1000 ml |

As matting dispersion was used the dispersion of particles in gelatin obtained in preparation 1.

When wound on a spool, it was found that the above protective layer effectively prevented diffusion of substitutents between the light-sensitive layer and the hydrophilic antihalation back coating. Moreover, after storage for some time in wound up form the protective layer did not adhere to the adjacent antihalation layer so that the formation of so-called contact stains was prevented. Further, Newton rings were not formed during printing and enlarging.

EXAMPLE 2

A photographic film support was provided on one side with a hydrophilic antihalation layer from the following coating composition at 36°–38° C. at a coating rate of 1000 g/16 sq.m:

| | |
|---|---|
| gelatin | 88 g |
| 5% aqueous solution of antihalation dyestuffs | 100 ml |
| 12% aqueous solution of saponine | 30 ml |
| 5% aqueous solution of the sodium salt of tetradecylsulphate | 6 ml |
| matting dispersion | 4.5 g |
| 5% aqueous solution of dimethylolurea | 30 ml |
| demineralized water up to | 1000 ml |

The matting dispersion used was that obtained in preparation 1.

After drying of the layer there was applied on the other side of the support a light-sensitive layer containing silver halide.

When the photographic material, just as in Example 1, was wound on a spool and stored for some time, there did not occur any interaction between light-sensitive layer and antihalation layer; no contact stains could be found and during printing and enlarging no Newton rings were formed.

EXAMPLE 3

A photographic element comprising a film support having a hydrophilic antihalation back coating was provided with a protective coating upon this antihalation layer from the following coating composition at 36°–38° C. at a coating rate of 1000 g/95 sq.m:

| | |
|---|---|
| gelatin | 60 g |
| matting dispersion of preparation 3 | 30 g |
| 12% aqueous solution of saponine | 40 ml |
| 5% aqueous solution of the sodium salt of tetradecylsulphate | 19 ml |
| 5% aqueous solution of dimethylolurea | 17 ml |
| demineralized water up to | 1000 ml |

After drying there was applied on the other side of the support a light-sensitive layer containing silver halide.

The photographic material obtained possessed the same good properties as in Examples 1 and 2.

EXAMPLE 4

A longitudinally stretched polyethylene terephthalate film support having a thickness of 0.350 mm was coated with a primer layer essentially consisting of a 20% by weight latex of a copolymer of vinylidene chloride, vinyl chloride, n-butyl acrylate, and itaconic acid (30:50:18:2% by weight) as described in Example 3 of the United Kingdom Patent Specification No. 1,234,755 mentioned hereinbefore. Subsequently, the film was stretched transversely 3.5 times.

The primer layer was covered at a ratio of 30 sq.m/l with a subbing layer from the following coating composition:

| | |
|---|---|
| water | 554 ml |
| gelatin | 8 g |
| ethanol | 396 g |
| 5% solution in water/methanol (50:50) of HOSTAPAL W | 4 ml |
| 9.4% solution in water of ULTRAVON W | 4 ml |
| caprolactam | 4 g |
| 30% aqueous dispersion of colloidal SiO$_2$ with an average particle size of 25 nm | 40 ml |
| ADMUL 1483 | 2 ml |
| matting dispersion of preparation 3 (average particle diameter 3 μm) | 100 mg |

HOSTAPAL W is the trade-mark of Farbwerke Hoechst for a dispersing agent consisting of polyoxyethylene ether of nonylphenol.

ULTRAVON W is the trade-mark of Ciba-Geigy AG for a dispersing agent consisting of the disodium salt of heptadecyl benzimidazole disulphonic acid.

ADMUL 1483 is the trade-mark of Food Chemical Industries for a polyglycerol consisting of a mixture of di-, tri-, and tetra-glycerol.

The thickness of the layer averaged 0.6 μm.

The resulting film support was conveyed through a coating device, the above subbing layer contacting the high-polished conveyor rollers. To the opposite side was applied a backing layer as known in the graphic art. No difference in speed could be observed up to 90 m/min between the film transport speed and the rotation speed of the conveyor rollers.

For comparison purposes a film support was treated as described above, with the difference, however, that the matting agent having an average thickness of 3 μm was omitted from the subbing layer. The film was coated with the same backing layer. A beginning of difference in speed between the film running speed and the rotation speed of the conveyor rollers was noticed from a much lower speed.

Thus the matting agent allowed the backing layer to be applied at a much greater speed, which means much more economically.

In a separate step a light-sensitive gelatin silver halide emulsion layer of the graphic type was coated on the front side of the polyester film support. Both photographic materials i.e. one without and one with matting agent of 3 μm in the subbing layer did not show deviating physical and photographic characteristics, so that could be concluded that the presence of the matting agent did not impair the physical and photographic properties of the photographic material.

EXAMPLE 5

The process of Example 4 was repeated but a primer layer was coated from a latex of a copolymer of vinyl chloride, vinylidene chloride, n-butyl acrylate, and itaconic acid (63:30:5:2% by weight). Thereupon a subbing layer was applied at a ratio of 30 sq.m/l from the following composition:

| | |
|---|---|
| water | 554 ml |
| gelatin | 8 g |
| ethanol | 396 g |

| | |
|---|---|
| HOSTAPAL W (trade-name) (5% solution in water/methanol (50:50)) | 4 ml |
| ULTRAVON W (trade-name) 9.4% aqueous solution | 4 ml |
| caprolactam | 4 g |
| 30% aqueous dispersion of colloidal SiO$_2$ having an average particle size of 25 nm | 40 ml |
| hexane triol | 2 ml |
| matting dispersion of preparation 3 (average particle diameter 3 μm) | 100 mg |

The thickness of the layer averaged 0.6 μm. In the coating room, the subbed film could reach a higher film running speed without slipping on the conveyor rollers than a film comprising no matting agent with an average diameter of 3.0 μm in the subbing layer.

A subbing layer of this type did not show any photographic disadvantages.

When in the above process the matting dispersion of particles having an average particle size of 3 μm, was replaced by a dispersion of particles of SiO$_2$ having an average particle size of more than 5 μm, e.g. as obtained by a known milling process, a film running speed of at least 90 m/min could also be reached without slipping of the rollers. The subbed film support, however, was slightly hazy and this disadvantage was still present after the application of a graphic backing layer to the rear side and of a light-sensitive emulsion layer to the front side.

Thus, the photographic material comprising subbing layer of this type was photographically unacceptable.

EXAMPLE 6

Both sides of a longitudinally stretched polyethylene terephthalate film support having a thickness of 0.600 mm were coated with a single subbing layer at a ratio of 100 sq.m/l from the following coating composition:

| | |
|---|---|
| water | 310.5 ml |
| 10% aqueous solution of the sodium salt of sulphosalicyclic acid | 230 ml |
| sorbitol | 12.5 ml |
| 40% latex of co(vinylidene chloride methyl methacrylate/itaconic acid) (88:10:2% by weight) | 250 ml |
| AKYPO OP 80 | 40 ml |
| 30% latex of co(butadiene/methyl methacrylate/itaconic acid) (49:49:2% by weight) | 118 ml |
| 40% aqueous solution of dimethyl trimethylol melamine formaldehyde resin | 22 ml |
| 10% aqueous solution of HOSTAPAL B | 10 ml |
| matting dispersion of preparation 2 (average particle diameter 3.3 μm) | 112 mg |

AKYPO OP 80 is the trade-name of Chemy, the Netherlands, for a compound corresponding to the following structural formula:

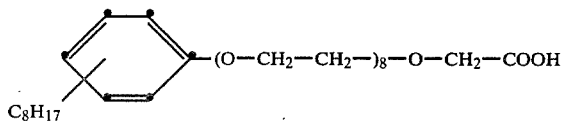

HOSTAPAL B is the trade-name of Farbwerke Hoechst for sulphated diisoheptyl-isohexylphenyl-polyoxyethylene.

The subbed film support was dried and stretched transversely 3.5 times so that a film having a thickness of 170 μm was obtained. Finally the film support was heat-set at 220° C.

During speed tests with checked angles of lap of the film support over the conveyor rollers, a speed of at least 120 m/min could be obtained at an angle of lap of the film over the rollers of 7°, without slipping between film support and roller.

A comparison material having a subbing layer without matting agent started slipping at 60 m/min in identical running conditions.

Although the invention has been described with particular reference to hydrophilic colloid layers of a light-sensitive silver halide material, the matting composition of the invention can also be used in other materials e.g. in the imaging layers or surface layers of photopolymerisation materials, diazotype materials, thermographic materials, etc.

We claim:

1. A photographic light-sensitive silver halide material incorporating a layer formed from a coating composition comprising gelatin and dispersed therein a matting agent, said coating composition having been prepared by mixing in aqueous medium urea, formaldehyde, and an aqueous colloidal dispersion of silica particles, said mixture being buffered to keep the pH of the mixture at 3.2 or lower, polycondensing the urea and formaldehyde while vigorously stirring the mixture until particles comprising urea-formaldehyde resin and silica are formed having an average particle size between 1 and 8 μm, reducing the rate of stirring and raising the pH of the mixture to 5 or higher to prevent afterpolycondensation and agglomeration of the polymer particles and dissolving a gelatin in the reaction mixture.

2. A photographic light-sensitive material according to claim 1, wherein the said layer is a protective layer over a light-sensitive layer and contains from 2 to 3 g of the matting agent per 30 g of the gelatin present in the coating composition.

3. A photographic light-sensitive material according to claim 1, wherein the said layer is a subbing layer comprising particles of an average diameter of 2 to 4 μm in such an amount that in the dried layer from 0.1 to 10 mg of the matting particles are present per sq.m.

4. The photographic light-sensitive material according to claim 1, wherein the silica particles have an average diameter between 10 and 100 nm.

5. The photographic light-sensitive material according to claim 1, wherein the said mixture is buffered with a mixture of citric acid and disodium hydrogen phosphate.

6. The photographic light-sensitive material according to claim 1, wherein the said polycondensation reaction occurs at a temperature below 50° C.

7. The photographic light-sensitive material according to claim 1, wherein the polycondensation of urea and formaldehyde occurs in the presence of a salt of ammonium to produce spherical particles.

8. The photographic light-sensitive material according to claim 7, wherein the ammonium salt is ammonium chloride or ammonium sulphate.

* * * * *